…

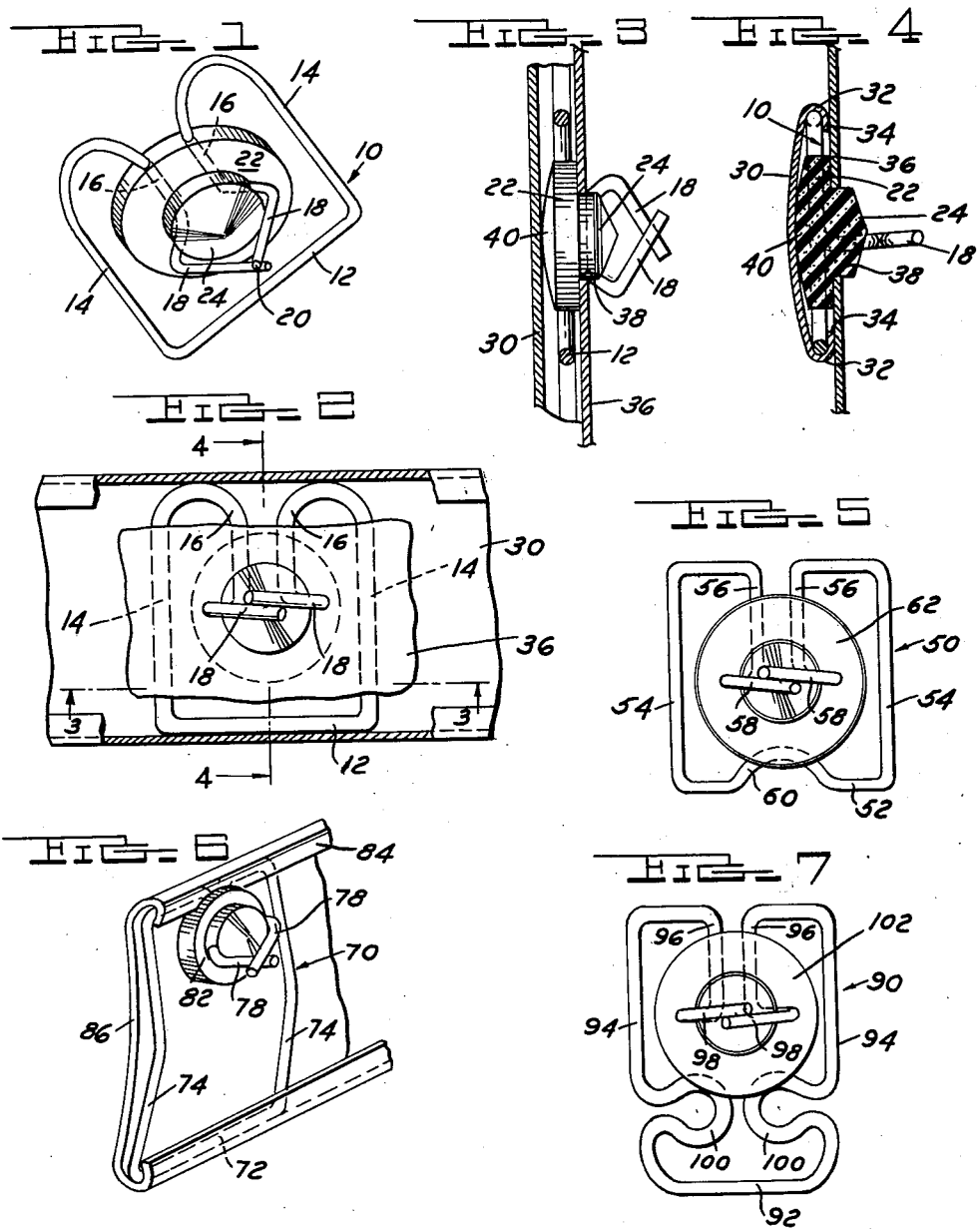

United States Patent Office 3,132,727
Patented May 12, 1964

3,132,727
SPRING RETAINER AND SEAL
Timothy G. Meulenberg and Robert L. Redmond, Detroit, Mich., assignors to Automotive Rubber Company, Inc., Detroit, Mich., a corporation of Michigan
Filed Sept. 16, 1950, Ser. No. 185,258
13 Claims. (Cl. 189—88)

This invention relates to a spring retainer and seal which consists of a spring clip of the type to be retained in an aperture in a supporting wall and having means thereon to seal the aperture as the clip is inserted in place.

For many years spring clips have been used for holding upholstery parts and trim metal in place. An example of a patented clip is that shown in the patent to Place, No. 1,679,266, issued July 31, 1928. Another variation of this construction for use in holding molding in place is shown in the patent to Place, No. 1,964,331, issued June 26, 1934. The fastening clips in these devices consisted of a head member and spring member extending away from the plane of the head member having resilient relation to each other so that they snap through the apertures in the retaining wall and remain in this position.

The present invention is particularly adapted to fastening channel molding on the outside of a vehicle. These channel moldings are placed on the vehicle for decorative purposes and are held in place by these spring clip fasteners spaced at intervals along the length of the molding.

The present invention contemplates an improved clip which carries a body of sealing material which closes the hole through which the fastening devices pass to seal the same against dust, dirt, air and moisture. This sealing body also helps to reduce any rattling noise that might develop through wear of the parts and has a function in the installation in holding the clip in place with respect to the molding prior to installation and exerting a resilient force on the molding subsequent to the installation to reduce also the possibility of rattling and noise.

Other objects and features of the invention will be apparent in the following description and claims.

Drawings accompany the specification, and the various views thereof may be briefly described as:

FIGURE 1, a perspective view of a completed clip.

FIGURE 2, a view of the clip in assembly showing the relationship to the retaining wall and the molding.

FIGURES 3 and 4, sectional views on lines 3—3 and 4—4 of FIGURE 2.

FIGURE 5, a view of a modified type of clip in which the frame member aids in maintaining the sealing body in position.

FIGURE 6, a modified construction in which the sealing body and the retaining projections are maintained at one end of a head member to co-operate with one edge of a channel molding.

FIGURE 7, another modification of the invention in which a resilient head is formed with integrally projecting means to locate the sealing body.

Referring to the drawings, a spring clip fastener is shown having a head member 10 formed of wire which is bent from a mid-portion 12 to have U-shaped legs 14, each of which is looped around to extend part-way across the enclosed area formed thereby toward the base 12 in inward extensions 16. These extensions 16 are bent in a direction away from the plane of the enclosed area into legs 18 which define a diamond-shaped area and which are crossed at 20. These legs 18 are resilient and form the fastening member for the head.

A sealing body is cast or injection molded around the members 16 and the roots of the legs 18, this body being substantially circular in a body portion 22 and having a smaller nipple extension 24 which further embeds portions of the legs 18 rising away from the inward extensions 16. The relationships of these parts are shown in FIGURES 2, 3, and 4.

A channel molding 30 having sides 32 with inwardly extending portions 34 is to be retained on an apertured plate 36 having a circular opening 38 therein. The channel molding 30 slidably receives the head 10, and due to an extended portion 40 on the body 22, the entire assembly is held in position relative to the channel since the body portion 22 and the nipple 24 are preferably formed of a compressible rubber such as sponge rubber. Other materials such as soft rubber, dense rubber, or plastic may be used for the sealing body but sponge rubber has proved to be quite satisfactory.

When the legs 18 are inserted through the aperture 38, the nipple 24 will also pass through the aperture since it is intended to have the same diametric dimension as the distance between the outer surfaces of the legs at the retaining wall. Also, the body portion 22 lies up against the plate 36 around the aperture so that a double seal is obtained.

In FIGURE 5 a modified device is shown in which a head member 50 has a base 52 with sides 54 which are bent around to form inward extensions 56 having the usual legs 58. This construction differs in that the base 52 is curved inwardly at 60 to become embedded in the periphery of the body portion 62 which also embeds the inward extensions 56. Thus, additional support is provided for the body 62.

In FIGURE 6, I have shown a head portion 70 which has a base 72 with sides 74 and the legs 78 positioned quite near the top of the head so that the body portion 82 of the sealing insert will have contact with the inturned side 84 of the channel 86. This side contact will locate the fasteners with respect to the channel in the same way that the extension 40 locates the fastener in FIGURE 4.

In FIGURE 7 another modification is shown in which a head portion has a base 92 with sides 94 with inturned portions 96 which terminate in legs 98. The sides 94 are looped in at 100, the loops extending toward each other and into the area defined by the head, portions of the loops being embedded in the body 102 of the sealing insert. This arrangement provides a head which is slightly resilient to enable it to be inserted into a channel with a resilient fit therein. The body 102, therefore, receives considerable support around its periphery from structural members of the head. The bodies 62, 82 and 102 may each have a nipple extension as defined in relation to FIGURES 1 to 4 which embeds portions of the legs above the body member.

It will thus be seen that there has been disclosed a molding retainer clip in which a soft rubber or sponge rubber insert molded part of the head member of the clip serves to position the clip relative to the molding which it is to support and serves to seal the aperture of the retaining wall as well as to exert a resilient force on the molding prior to and subsequent to assembly to insure a snug fitting clip member which also effectively will seal the retaining aperture in the supporting panel.

We claim:

1. A spring fastener clip of the type to be retained on an apertured wall comprising a frame member fashioned to define a geometric area and having portions of the frame extending into said area, spring clip members connected to, and extending away from the general plane of, the frame and fashioned to snap into a retaining opening, and a resilient sealing insert of soft deformable material molded around portions of said members comprising a body portion lying generally in the plane of the frame and embedding portions of the frame member within said area and a nipple portion integral with and projecting from said body portion surrounding portions of said clip members adjacent the frame member.

2. A spring fastener clip as defined in claim 1 in which the body portion extends away from the frame in a direction opposite to the clip members.

3. In combination, a perforated structure, trim material to be attached thereto, and retainers for said material as defined in claim 1 in which the frame member engages the trim material, the spring clip members extend into an aperture of the perforated structure, and the body of the sealing insert abuts against the structure adjacent the aperture while the nipple portion passes through and blocks the aperture.

4. A spring fastener clip of the type to be retained on an apertured wall comprising a frame member fashioned to define a geometric area and having portions of the frame extending into said area, spaced spring clip members connected to, and extending away from the general plane of, the frame and fashioned to snap into a retaining opening, and a resilient sealing insert of soft deformable material molded around portions of said members completely within said area and positioned generally within the frame and extending away from the frame around the base of the spaced clip members to lie against a wall receiving the clip members.

5. In combination a perforated structure, trim material to be attached thereto, and a spring fastener as defined in claim 4 to join the two, the spring clip members extending into an aperture of the perforated structure, the frame member engaging the trim material, and the sealing insert blocking the retaining aperture to seal the same against foreign matter.

6. In combination, a trim material in strip form and retainers for said strip as defined in claim 4 in which the frame member has a sliding engagement with the strip and the sealing insert is formed to contact said strip to create a slightly resilient frictional engagement therewith.

7. In combination, a perforated structure, trim material in strip form, and retainers for said strip as defined in claim 4 in which the frame member has a sliding engagement with the strip and the spring clip members extend into an aperture in the perforated structure, the sealing insert being then positioned to seal said aperture.

8. A combination trim and fastening means to be held on a perforated structure by reason of means passing through perforations in said structure comprising, trim material in strip form having opposed flanges to form a re-entrant groove on one side of said strip, a fastening clip comprising, a frame member fashioned to define a geometric area and having portions of the frame extending into said area, spring clip members connected to, and extending away from the general plane of, the frame and fashioned to snap into an aperture in the perforated structure, said frame member being dimensioned to slide freely within the re-entrant opening of the strip member, and a sealing insert formed of soft, compressible, resilient material molded around portions of said members positioned generally within the frame and extending around the base of the clip members having a body portion to lie against the perforate structure to form a seal around a perforation in said structure and having a nipple portion integral with and projecting from said body portion adapted to pass through a perforation in said structure with said clip members and an extension on said body portion on the side opposite said nipple portion projecting outwardly from said body portion and from said frame to contact the inner wall of said strip member to frictionally engage the same, whereby said fastening member can be assembled in said strip member and will be held against accidental displacement therein by reason of the frictional engagement of said insert with said strip.

9. A spring fastener clip of the type to hold two parts together, one of said parts comprising, a perforate, apertured wall and the other comprising a strip member having a re-entrant groove on the fastening face, said clip comprising a frame member fashioned to define a geometric area having portions of the frame extending into said area, spring clip members connected to said portions and extending away from the general plane of the frame and fashioned to snap into a retaining opening in the wall, said frame member being adapted to slide relatively freely in the groove of the strip member, and a resilient sealing insert of soft deformable material molded around portions of said members comprising, a body portion lying generally in the plane of the frame and embedding portions of the frame member within the frame, a nipple portion smaller than and integral with and projecting from said body portion on one side thereof surrounding portions of said clip members adjacent the frame member, and an extension on the other side of said body portion away from the frame in a direction opposite from the clip portions adapted to co-operate with the walls of the strip member to locate the fastener clips on the strip member prior to assembly and to serve as an anti-rattle connection in the final assembly.

10. A fastener clip of the type to be retained on an apertured wall comprising, a body member defining a geometric frame area with openings therein and having marginal portions adapted to engage and retain a molding on said wall, spaced fastening extensions integral with said body member and extending away from the general plane of the frame adjacent the openings, said fastening extensions being fashioned to position in divergent relation to each other for at least a portion of their length to co-operate with the edges of an aperture in said wall to hold the frame adjacent said apertured wall, and a sealing insert of soft deformable, water-resistant material bonded on portions of said body member adjacent said openings and having a raised portion positioned around said spaced fastening extensions to create a water seal of the aperture in said wall.

11. A fastener clip of the type to be retained on an apertured wall comprising, a body member defining a geometric area having opposed marginal portions adapted to engage and retain a molding on said wall, spaced fastening extensions on said body between said opposed marginal portions extending away from the general plane of the body member, said fastening extensions being fashioned to position in divergent relation to each other for at least a portion of their length to co-operate with edges of an aperture in said wall to hold the body member adjacent the wall, and a sealing insert of soft deformable, water-resistant material bonded on portions of said body members adjacent the proximal ends of said fastening extensions and having a raised portion around and embedding the said extensions to create a water seal of the aperture in said wall into which said extensions may project.

12. A fastening device for removably attaching members together comprising a snap fastener having a head shaped to provide an open border frame engageable with one member and having a shank joined to and projecting transversely from said head, said shank being positioned for projection through an opening in another member, a resilient body of soft deformable plastic material having a base surrounded by said border frame, said border frame having exposed surfaces laterally outwardly of said base for direct engagement with said one member to securely clamp the latter to the other member, said body of plastic material having a portion projecting from said base in the direction of said shank for sealing engagement with the marginal edges of the opening through which the shank is adapted to project, and said portion completely enclosing and bonded to the portion of the shank joined to said head.

13. A fastening device for removably attaching members together comprising a snap fastener having a head shaped to provide a border frame engageable with one member and having a shank joined to and projecting transversely from said head, said shank being positioned for projection through an opening in another member, a resilient body of soft deformable plastic material having a base surrounded by said border frame, said border frame having exposed surfaces laterally outwardly of said base for direct engagement with said one member to securely clamp the latter to the other member, said body of plastic material having a portion projection from said base in the direction of said shank for sealing engagement with the marginal edges of the opening through which the shank is adapted to project, and said portion completely enclosing and bonded to the portion of the shank joined to said head.

References Cited in the file of this patent

UNITED STATES PATENTS

| | | |
|---|---|---|
| 566,152 | Ellard | Aug. 18, 1896 |
| 744,385 | McClellan | Nov. 17, 1903 |
| 1,845,991 | Walters | Feb. 16, 1932 |
| 2,192,344 | Fernberg | Mar. 5, 1940 |
| 2,215,428 | Place | Sept. 17, 1940 |
| 2,245,375 | Wiley | June 10, 1941 |
| 2,252,925 | Hall | Aug. 19, 1941 |
| 2,257,855 | Place | Oct. 7, 1941 |
| 2,287,606 | Eady | June 23, 1942 |
| 2,439,516 | Holcomb | Apr. 13, 1948 |
| 2,455,669 | Gagnier | Dec. 7, 1948 |
| 2,528,288 | Rublee | Oct. 31, 1950 |
| 2,643,433 | Scott | June 30, 1953 |